United States Patent [19]

Bandy et al.

[11] Patent Number: 5,402,882
[45] Date of Patent: Apr. 4, 1995

[54] COMPACT DISK HOLDER INCLUDING DISK EXTRACTOR

[76] Inventors: Gregory S. Bandy, 2817 Cedar Ave. South, Renton, Wash. 98055; Kevin D. Keierleber, 650 14th Ave. W., Kirkland, Wash. 98033

[21] Appl. No.: 25,324
[22] Filed: Feb. 22, 1993
[51] Int. Cl.⁶ .................... B65D 85/57; G11B 7/26
[52] U.S. Cl. ...................... 206/310; 369/291
[58] Field of Search ............... 369/291, 290; 360/133, 360/137; 206/310–313, 444, 493

[56] References Cited

U.S. PATENT DOCUMENTS

| | | | |
|---|---|---|---|
| 3,896,929 | 7/1975 | Mills | 206/493 |
| 4,140,219 | 2/1979 | Somers | 206/493 |
| 4,793,480 | 12/1988 | Gelardi et al. | 360/99.06 |
| 4,871,064 | 10/1989 | Hehn et al. | 206/493 |
| 4,928,825 | 5/1990 | Hehn | 206/493 |
| 5,016,241 | 5/1991 | Lee et al. | 369/291 |
| 5,238,107 | 8/1993 | Kownacki | 206/493 |
| 5,251,750 | 10/1993 | Gelardi et al. | 206/493 |
| 5,284,248 | 2/1994 | Dunker | 206/444 |

FOREIGN PATENT DOCUMENTS 2243145 10/1991 United Kingdom ............... 206/310

Primary Examiner—Robert S. Tupper
Assistant Examiner—Brian E. Miller
Attorney, Agent, or Firm—H. Albert Richardson

[57] ABSTRACT

A holder for a compact digital disk. The holder includes a base having a hub on which a disk may be frictionally retained. It also includes a lid pivotally mounted on the base and having an extractor for disengaging the disk from the hub as the lid is moved from the closed to the open position. The extractor additionally functions as a latch to retain the lid in the closed position. Also, a deflector is positioned on top of the hub to retain the disk after it has been disengaged from the hub.

4 Claims, 4 Drawing Sheets

COMPACT DISK HOLDER INCLUDING DISK EXTRACTOR

BACKGROUND OF THE INVENTION

This invention generally relates to compact disk media (CD's) and more particularly to a holder for a CD-ROM and audio CD.

With the advent of compact digital media a variety of holders or containers for shipping and storing the disks have appeared on the market. One such holder has a shallow rectangular plastic base with a centrally located hub on which the CD may be seated. The disk is frictionally retained on the hub by a plurality of radially extending flexible segments. The holder also includes a cover pivotally mounted on the base. The base is slightly smaller in width than the diameter of the disk so that diametrically opposing edges of the disk extend slightly beyond the sides of the base. In order to remove the disk from the holder, the lid is opened and the disk is grasped by placing the thumb and index finger on the extended edges of the disk and then lifting the disk free from the hub by pressing the forefinger on the hub.

Another type of holder on the market includes a base of similar design but larger in dimension so that the disk is completely retained within the base. Access to the edges of the disk for removal purposes is provided by diametrically opposing pairs of recesses formed in the base at the periphery of the disk. Removal of the disk from the holder is accomplished in the same manner as with the first holder described above. The most significant problem with both of these holders is that they are somewhat cumbersome to use and require a certain amount of force for disk removal. As a result, users occasionally drop the disks while attempting to remove them.

A third type of holder found in the prior art has a base to which a rectangular top and bottom are mounted for rotation about a common axis. The disk is retained on a hub assembly formed on the base. In order to remove the disk from the holder, the top is opened to a position where it engages the base. As it is further opened, it causes the base to pivot upward from the bottom, permitting a pivoting member in the hub assembly to rotate, which in turn permits the CD to be released from the hub. While this type of holder appears to function well, it is more complex and more expensive to manufacture than the two described above.

Further, a common problem found in each of the above holders is determining how to open the holder when closed. Many users find that they must examine the holders closely and then manipulate them in various ways before successfully opening them.

Accordingly, it is an object of this invention to provide for an improved holder for compact disk media in which the disk is automatically disengaged from the base upon opening of the lid by the user but which is relatively simple in design and inexpensive to manufacture.

It is another object of this invention to provide for an improved holder for CD's in which the disk can be removed from the base without direct application of force to the disk by the user.

It is another object of this invention to provide for an improved CD holder which can be easily opened by a user even if he or she is unfamiliar with the device.

It is yet another object of this invention to provide for a holder for CD's in which the lid can be constructed of paper or cardboard, thereby reducing cost and providing a surface upon which graphics and other information can be printed.

SUMMARY OF THE INVENTION

This invention can be broadly summarized as providing for a holder for a compact digital disk. The holder includes a base adapted to frictionally retain the disk and a lid mountable on the base and including an extractor for disengaging the disk from the base.

In accordance with a more detailed aspect of this invention, the holder includes a lid pivotally mounted on the base for movement between an open and a closed position and an extractor having a barb extending through the disk cutout when the disk is seated on the hub. Particularly, the extractor acts to disengage the disk from the hub when the lid is moved from the closed toward the open position.

In accordance with another detailed aspect of this invention, the base also includes a deflector positioned on top of the hub for retaining the disk after is has been disengaged from the hub by the extractor.

DETAILED DESCRIPTION OF THE PREFERRED EMBODIMENTS

The novel features believed to be characteristic of this invention are set forth in the appended claims. The invention itself, however, may be best understood and its various objects and advantages appreciated by reference to the detailed description below and in connection with the accompanying drawings.

Figure 1:
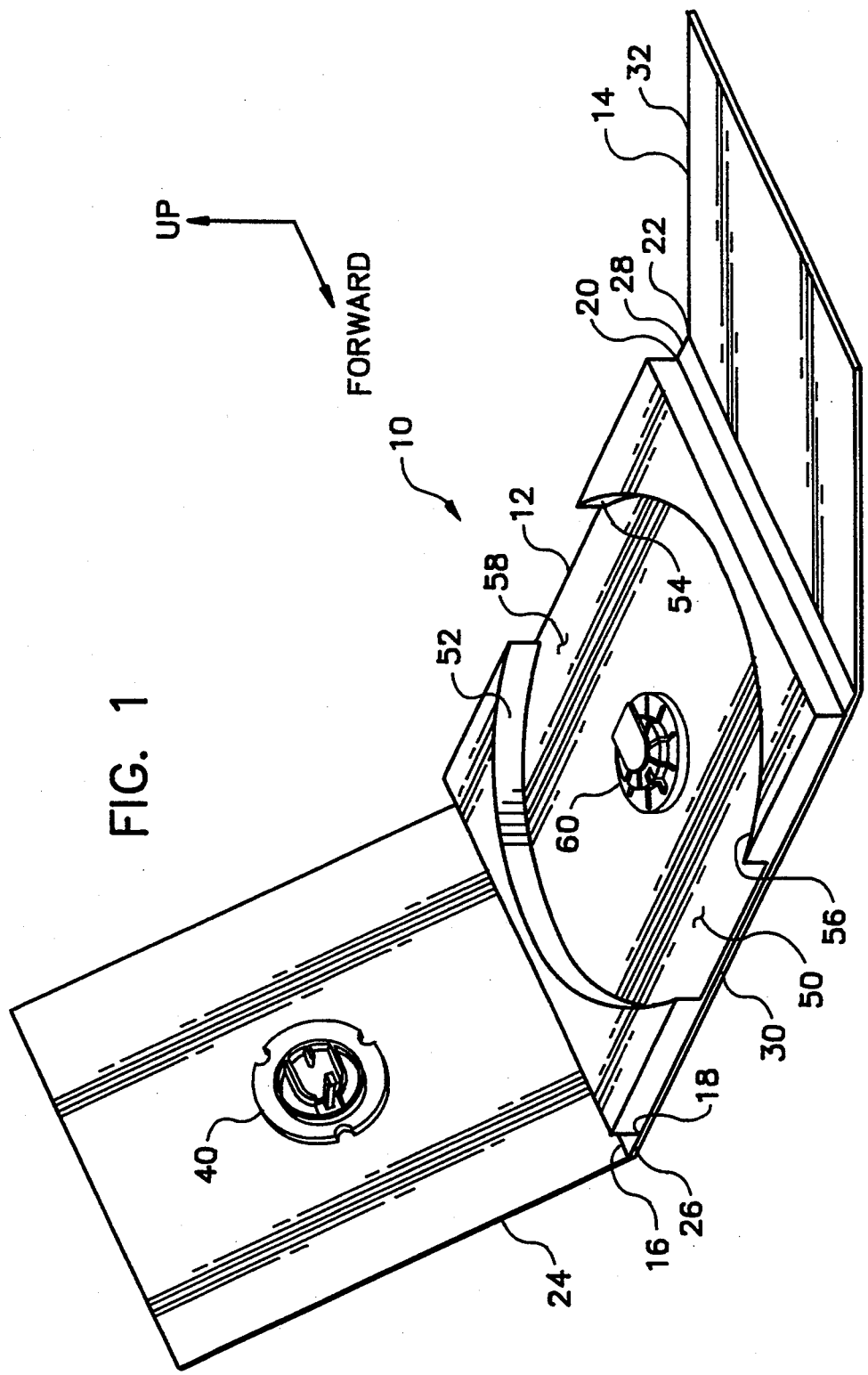
FIG. 1 is perspective view of the preferred embodiment of the invention showing the cover in an open position.
Figure 2:
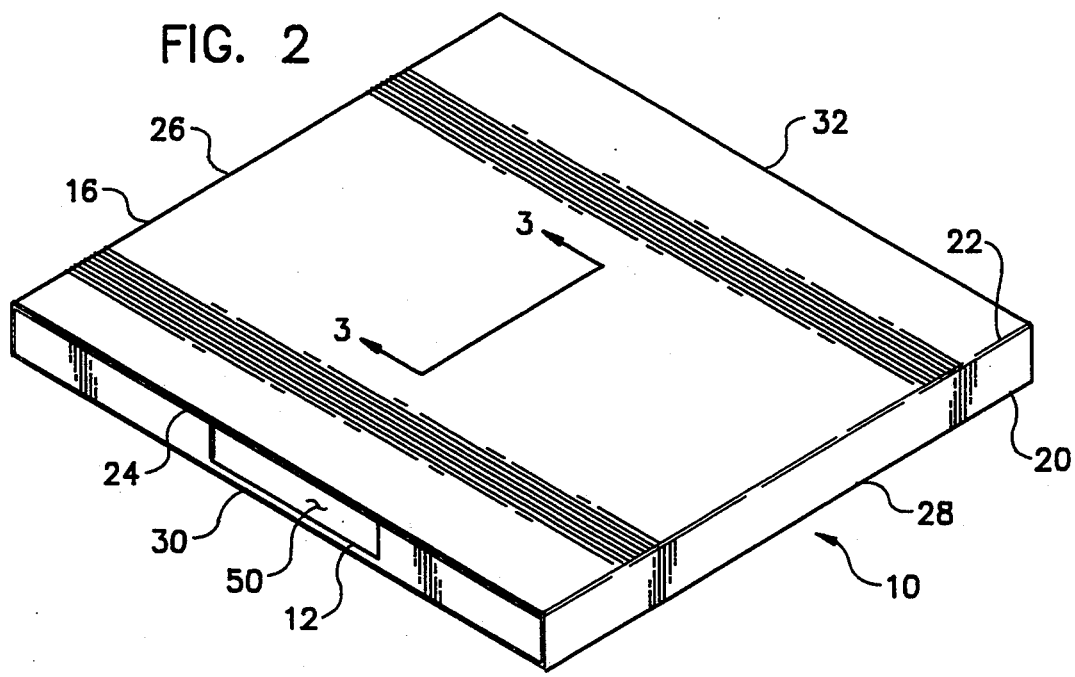
FIG. 2 is a perspective view of the embodiment of FIG. 1 in which the cover is in a closed position.

In FIG. 1 of those drawings, a holder for a compact digital audio disk is illustrated and generally designated by the number 10. FIGS. 1 and 2 show the holder in the open and closed positions, respectively. The holder includes a base 12, preferably formed of plastic, and a cover 14 which is preferably constructed from heavy paper or cardboard. The cover is folded along fold lines 16, 18, 20 and 22 so as to generally divide it into five sections. Those sections are lid 24, sides 26 and 28, central section 30 and flap 32. The holder also includes extractor housing 40 which is preferably formed from plastic. Both the base and the extractor housing are attached to the cover with an adhesive.

Figure 7:
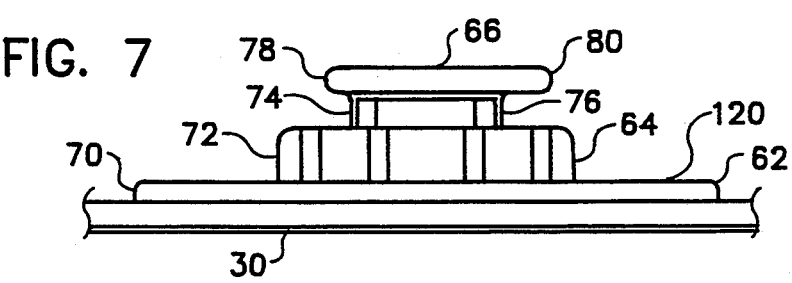
FIG. 7 is a partial side view of the base showing details of the hub assembly.
Figure 4:
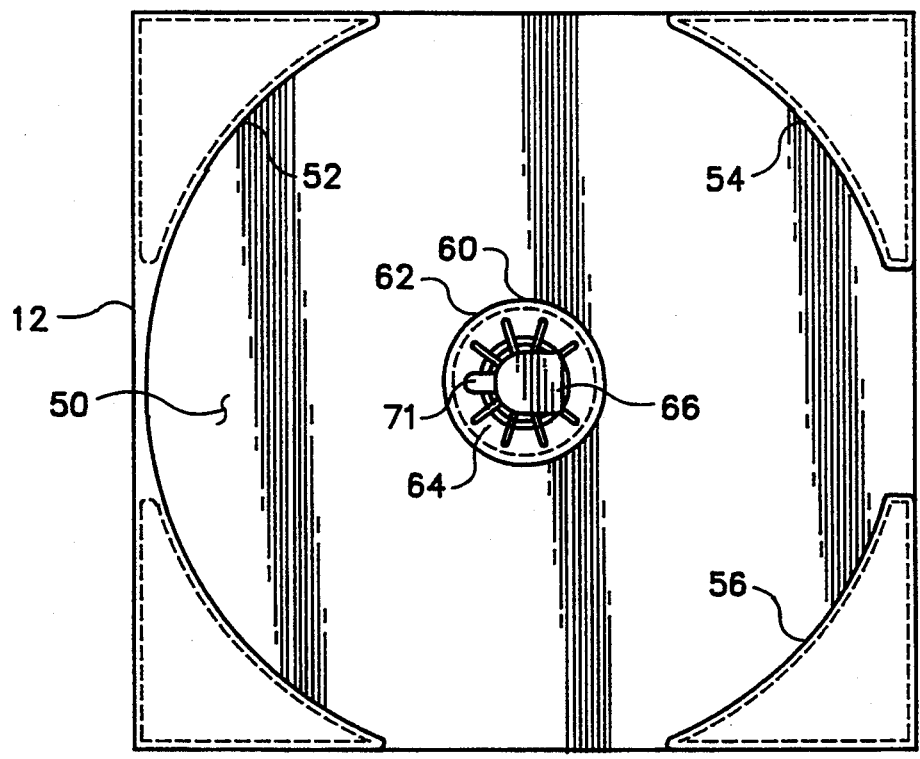
FIG. 4 is a top view of the base with the cover removed for clarity.
Figure 5:
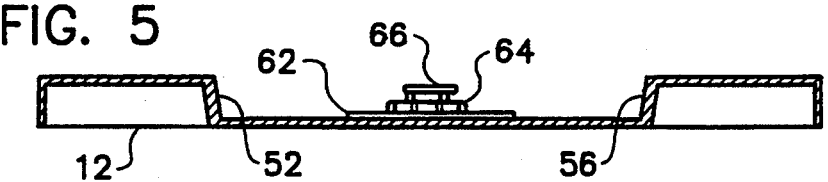
FIG. 5 is a sectional view taken at 5—5 of FIG. 4.
Figure 6:
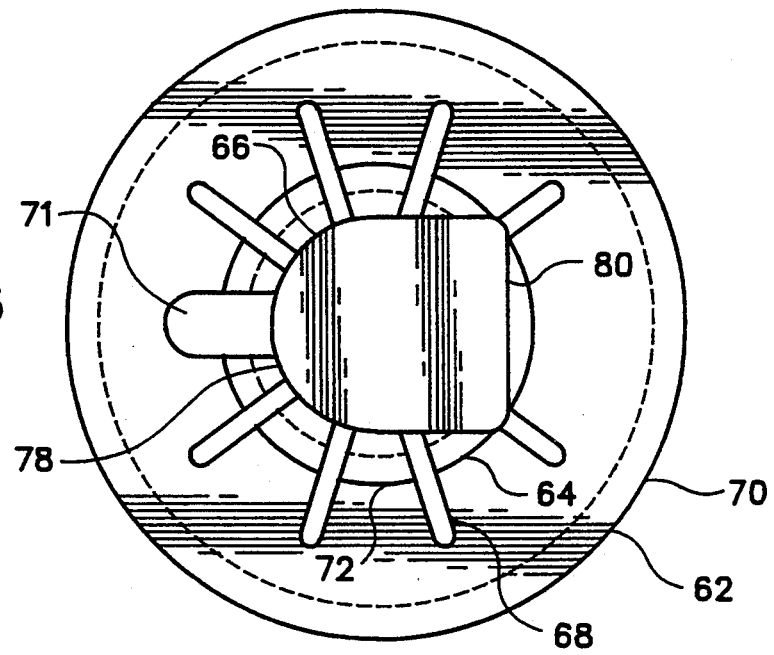
FIG. 6 is a top view of the hub assembly with the remainder of the base removed for clarity.
Figure 8:
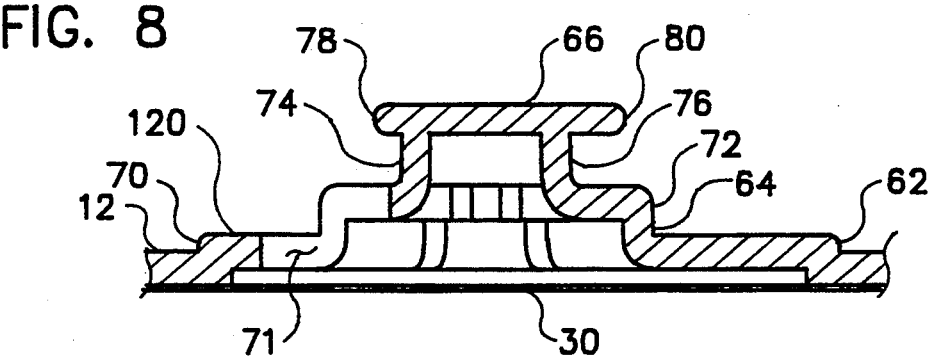
FIG. 8 is a sectional view taken at 8—8 of FIG. 6

The base, which is shown in more detail in FIGS. 4 through 8 includes protective recess 50 which is adapted to receive a standard CD. The recess is formed by arcuate walls 52, 54, and 56 and circular planar surface 58. Centrally disposed in the recess is hub assembly 60 which is integrally cast with the base. Referring to FIGS. 6 and 7 it can be seen that the base includes flange 62, hub 64 and deflector 66. The hub and the flange are divided into a plurality of pie-shaped segments by a plurality of slots such as slot 68 which extend radially outward from the center of the hub and terminate near the outer edge 70 of the flange. The purpose of the slots is to provide flexibility to the hub so as to facilitate engagement and disengagement of the disk. Also formed in the flange and the hub is opening 71 which is sized so that the extractor may pass through it as will be discussed below. The hub itself has an outer segmented surface 72 formed by those slots which has a normal diameter slightly greater than the diameter of the center cutout of a standard CD. Positioned at the top of the hub on supports 74 and 76 is deflector 66 which has a rounded forward end 78 and a squared aft end 80.

Figure 9:
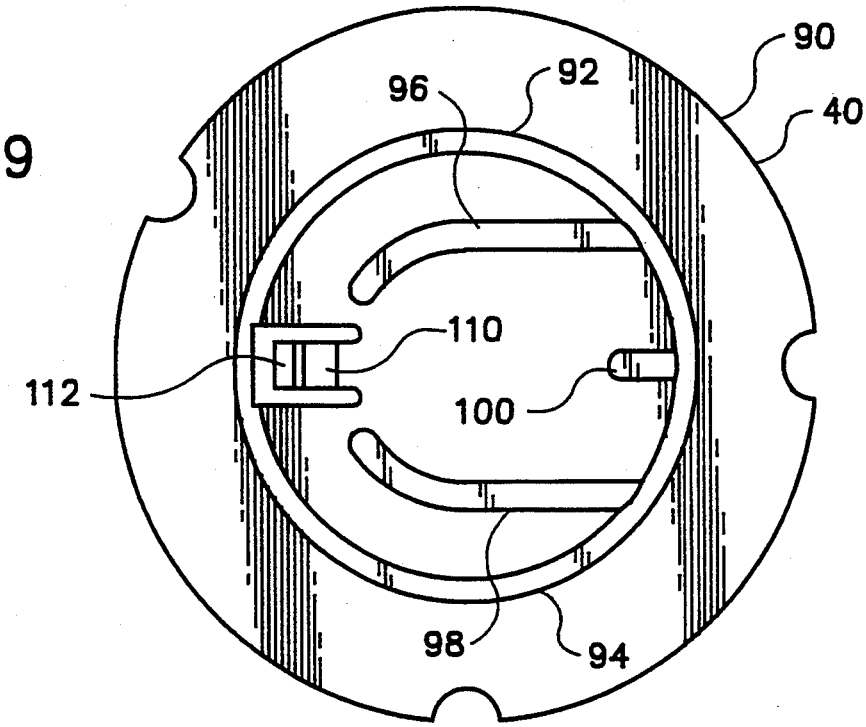
FIG. 9 is a top view of the extractor housing.
Figure 10:
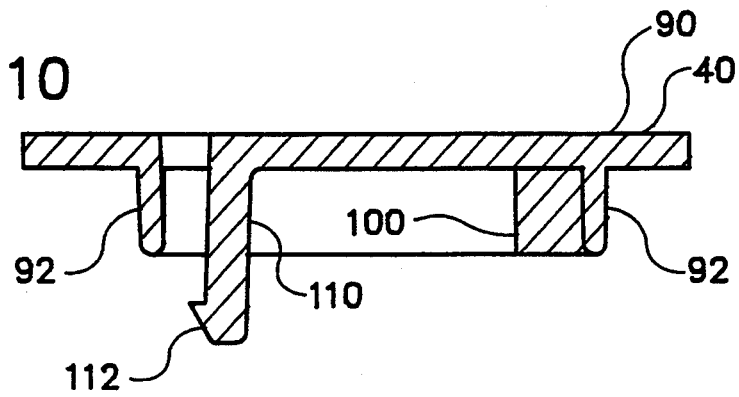
FIG. 10 is a sectional view taken at 10—10 of FIG. 9.

The extractor housing 40 is shown in more detail in FIGS. 9 and 10. It includes circular flange 90 and stop 92 including circular wall 94, curved walls 96 and 98 and spur 100. Extending outward from flange 90 is flexible elongated extractor 110 which includes forward facing barb 112.

Figure 3:
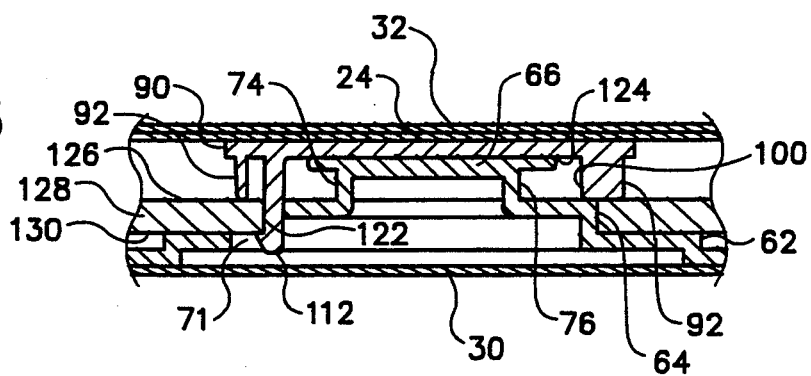
FIG. 3 is a partial sectional view taken at 3—3 of FIG. 2.

In order to insert a CD into the holder, cover 14 is opened and the disk is placed on the hub assembly with the disk cutout centered over the hub. Next the disk is forced downward onto the hub, causing the hub segments to deflect radially inward slightly until the disk rests on upper surface 120 of flange 62. In that position the disk is frictionally retained on the hub by the radially outward pressure of the hub segments. Next the cover is closed by folding lid 24 over the base. As the lid closes, extractor housing 40 is automatically aligned with the hub assembly so that the extractor enters opening 71 in the hub and the flange. As barb 112 passes the disk, it is deflected slightly rearward by inner edge 122 of the center cutout. As shown in FIG. 3, when the holder is in the closed position, lower surface 124 of flange 90 rests against deflector 66 and wall 92 rests against upper surface 126 of CD 128.

In order to remove the CD from the holder, the flap is lifted and then the lid is rotated toward an open position. As the lid is moved upward, barb 112 of the extractor engages bottom surface 130 of the CD, drawing it upward on the hub until it is free of it. At that point the CD will slide free of the barb and drop onto the hub where it can be simply lifted from the holder by the user.

A further advantage in the present invention is that the extractor also functions as a latch for the lid. As can be seen in FIG. 3, when the lid is in the closed position it will be retained in that position by barb 112 as it engages bottom surface 130 of the CD.

One problem encountered by the inventors during their development of the invention was that if the holder was opened while being held in a relatively level position it functioned well. Occasionally, however, the disk would remain engaged to the extractor after being removed from the barb. Also, if the holder was opened in a significantly tilted or non-level position the disk would occasionally slide out of the holder after being disengaged from the hub. In order to correct these problems the inventors added a deflector 66 to the hub assembly. The purpose of the deflector is to disengage the disk from the extractor and capture it if it begins to slide out of the holder after disengagement.

Thus it can be seen that the present invention provides for a compact digital audio disk holder which incorporates many novel features and offers significant advantages over the prior art. Although only one embodiment of this invention has been illustrated and described it is to be understood that obvious modifications can be made in it without departing from the true scope and spirit of the invention.

We claim:

1. A holder for a compact digital audio disk having a centrally located cutout, the holder comprising:
   a base including means for frictionally retaining the disk;
   a lid mounted on the base and including an extractor for contacting and disengaging the disk from the retaining means as the lid is moved from a closed to an open position.

2. The holder of claim 1 wherein the deflector is disposed on the retaining means.

3. The holder of claim 1 wherein the deflector is positioned on top of the retaining means.

4. A holder for a compact digital audio disk having a centrally located cutout, the holder comprising:
   a base including means for frictionally retaining the disk, said means including a hub on which the disk is seatable;
   a lid pivotally mounted on the base for movement between an open and a closed position including an extractor for contacting and disengaging the disk from the hub as the lid is moved from the closed to the open position; and
   a deflector positioned on top of the hub for disengaging the disk from the extractor after the extractor has disengaged the disk from the hub.

* * * * *

UNITED STATES PATENT AND TRADEMARK OFFICE
CERTIFICATE OF CORRECTION

PATENT NO. : 5,402,882
DATED : April 4, 1995
INVENTOR(S) : Gregory S. Bandy and Kevin Keierleber It is certified that error appears in the above-indentified patent and that said Letters Patent is hereby corrected as shown below:

In column 4 on line 33 immediately following the word "position", delete the period (.) and insert therefor a semi-colon (;) and the phrase "the base further including a deflector for disengaging the disk from the extractor after the extractor has disengaged the disk from the retaining means."

Signed and Sealed this

Thirty-first Day of October 1995

Attest:

BRUCE LEHMAN

Attesting Officer          Commissioner of Patents and Trademarks